United States Patent
Athas et al.

(10) Patent No.: US 9,524,353 B2
(45) Date of Patent: Dec. 20, 2016

(54) METHOD AND SYSTEM FOR PROVIDING PORTIONS OF INFORMATION CONTENT TO A CLIENT DEVICE

(75) Inventors: Gregory J. Athas, Lisle, IL (US); Michael P. Mitchell, Downers Grove, IL (US); Cesar Moreno, Elmwood Park, IL (US); Pawel Bak, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 443 days.

(21) Appl. No.: 12/028,319

(22) Filed: Feb. 8, 2008

(65) Prior Publication Data

US 2008/0201452 A1  Aug. 21, 2008

Related U.S. Application Data

(60) Provisional application No. 60/889,134, filed on Feb. 9, 2007.

(51) Int. Cl.
| | |
|---|---|
| *G06F 15/16* | (2006.01) |
| *G06F 17/30* | (2006.01) |
| *H04L 29/12* | (2006.01) |
| *H04L 29/08* | (2006.01) |

(52) U.S. Cl.
CPC ... *G06F 17/30905* (2013.01); *H04L 29/12594* (2013.01); *H04L 61/30* (2013.01); *H04L 67/28* (2013.01); *H04L 67/2828* (2013.01)

(58) Field of Classification Search
CPC ............... G06F 17/30905; H04L 29/12594; H04L 61/30; H04L 67/28; H04L 67/2828
USPC ......................................................... 709/218
See application file for complete search history.

(56) References Cited

U.S. PATENT DOCUMENTS

| | | |
|---|---|---|
| 6,763,388 B1 | 7/2004 | Tsimelzon |
| 7,072,984 B1 | 7/2006 | Polonsky et al. |
| 7,500,188 B1 | 3/2009 | Trapani et al. |
| 7,574,486 B1* | 8/2009 | Cheng et al. ................ 709/219 |
| 2002/0054090 A1 | 5/2002 | Silva et al. |
| 2004/0049737 A1 | 3/2004 | Simon Hunt et al. |
| 2005/0138033 A1* | 6/2005 | Katta et al. .................... 707/10 |

(Continued)

FOREIGN PATENT DOCUMENTS

| | | |
|---|---|---|
| JO | 2003-271508 A | 9/2003 |
| JP | 2000-285006 A | 10/2000 |

(Continued)

OTHER PUBLICATIONS

Pending U.S. Appl. No. 09/843,036, filed Apr. 25, 2001.

(Continued)

*Primary Examiner* — Abdelnabi Musa
(74) *Attorney, Agent, or Firm* — Alston & Bird LLP

(57) ABSTRACT

A method and system for providing portions of information content to a client device is presented. The present application provides a manner of personalizing information content for display on handheld or mobile devices. A user may identify sections of a web page as clips, and then request only the identified section instead of the entire web page from a server. Upon receiving the request, the server will load the web page, retrieve the identified section, transform the identified section for display on the client device, and then send the transformed information to the client device. The clip of information is then a live update from a web page that presents the latest content from a web page instead of a cached web page section.

20 Claims, 6 Drawing Sheets

(56) References Cited

U.S. PATENT DOCUMENTS

2006/0048051 A1* 3/2006 Lazaridis ............... 715/517
2006/0230355 A1* 10/2006 Nurmi .................. 715/745
2009/0125809 A1 5/2009 Trapani et al.

FOREIGN PATENT DOCUMENTS

| | | |
|---|---|---|
| JP | 2001-229106 A | 6/2001 |
| JP | 2002-007269 | 1/2002 |
| JP | 2002-342222 A | 11/2002 |
| JP | 2005-025295 | 1/2005 |
| JP | 2006-243829 | 9/2006 |
| WO | WO 2005/062205 | 7/2005 |
| WO | WO 2005/062205 A1 | 7/2005 |

OTHER PUBLICATIONS wvvw.webwag.com.
http://grid.orch8.net/clippings/grab.
www.apple.com/downloads/dashboard/.
International Search Report issued by the European Patent Office for PCT/US2008/053410.
First Examination Report issued by the European Patent Office in European application serial No. 08 729 381.7 on Dec. 3, 2009.
Canadian Office Action for related Canadian Patent Application No. 2 676 692 dated Jan. 11, 2012, pp. 1-4.
European Office Action for related European Patent Application No. 08 729 381.7.-2413 dated Jan. 17, 2012, pp. 1-4.
European Office action for corresponding EP application No. 08 729 381.7-2413 dated Feb. 8, 2011, pp. 1-5.
European Office Action for corresponding EP Application No. 08 729 381.7.-2413 dated Sep. 2, 2011, pp. 1-7.
Japanese Office Action for corresponding JP Application No. 2009-549255 dated Sep. 5, 2011, pp. 1-7.
Canadian Office Action issued for corresponding Canadian Application No. 2676692, mailed on Jan. 30, 2013.
Decision of Rejection for Japanese Patent Application No. 2009-549255, dated Nov. 6, 2012, pp. 1-4.
Indian Office Action for related application No. 1413/MUMNP/2009, dated Mar. 21, 2014, 2 pages.
Japanese Office Action for related application No. 2013-031786, transmitted Mar. 31, 2014, 6 pages (English Summary of OA included).
Office Action from Canadian Patent Application No. 2,676,692, dated Mar. 31, 2015.
Written Opinion from International Application No. PCT/US2008/053410 dated Aug. 12, 2008.

* cited by examiner

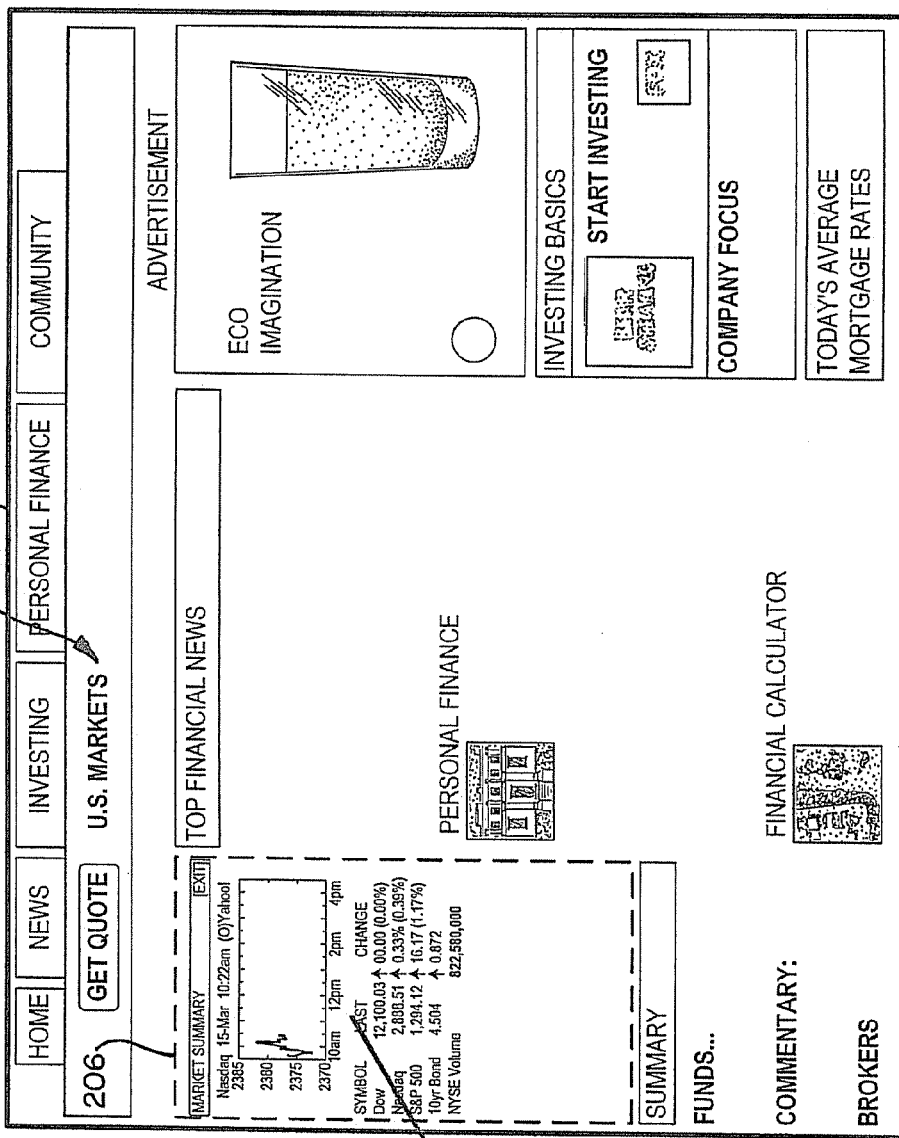
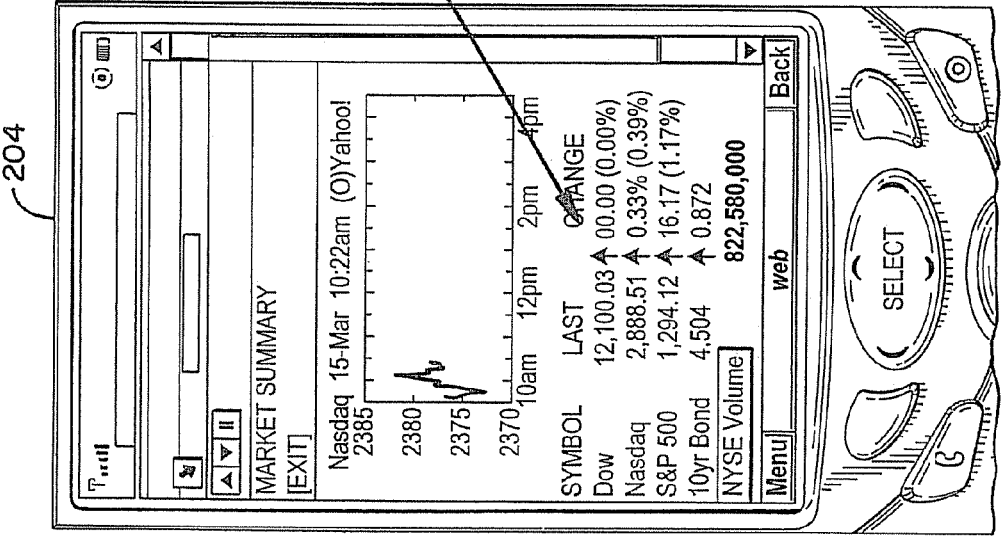
FIG. 2

FIG. 4

TARGET SITE   URL: weather.msn.com/search.aspx?weasearchs

CHICAGO.

FIVE-DAY FORECAST

| TOMORROW NOV 29 | FRIDAY NOV 30 | SATURDAY DEC 01 | SUNDAY DEC 02 | MONDAY DEC 03 |
|---|---|---|---|---|
| FAIR | FAIR | FLURRIES | SPRINKLES | SCATTERED FLURRIES |
| HI: 35° | HI: 35° | HI: 33° | HI: 39° | HI: 27° |
| LO: 23° | LO: 22° | LO: 31° | LO: 25° | LO: 15° |

HOURLY FORECAST (DETAILS) — 408

DETAILED TEN-DAY FORCAST

WEATHER MAPS

PRECIPITATION: LIGHT ▬▬▬▬▬ HEAVY (map showing Detroit, Toledo, Findlay, Columbus, Fort Wayne, Lafayette, Lansing, Kalamazoo, Muskegon, Milwaukee, Chicago, Rockford, Peoria, Moline, Dubuque, Cedar Rapids, Waterloo, La Crosse, Kirksville) — 402, 404

[ LOAD ]   ○ BROWSE WEB   ● CLIP SECTION

WEATHER RESOURCES

WEATHER
- GUIDE TO STORMS
- WEATHER EXPLAINED
- HEAT/COMFORT INDEX
- TABLE OF EQUIVALENT TEMPERATURES

SHOPPING
- SPORTS CLOTHING & SHOES
- LUGGAGE SHOP
- WEATHER STATIONS

OTHER
- FIND CHICAGO SINGLES

AROUND TOWN
- LOCAL GAS PRICES
- TRAFFIC INFORMATION
- MAP OF CHICAGO
- MOVIE TIMES

TOURISM
- LOCAL RESTAURANTS
- ENTERTAINMENT & EVENTS
- VISITOR'S GUIDE

TODAY'S WEATHER VIDEOS
- REPORT: DREW PETERSON'S RELATIVE ATTEMPTED SUICIDE
- WEDDING MELEE LEADS TO LAWSUIT FOR POLICE OFFICER
- TEEN STABBED TRYING TO BREAK UP GIRLS' FIGHT
- COMMISSIONER AT MEETING: PERAICA HATES BLACK PEOPLE

ADVERTISEMENT — 410

TODAY'S WEATHER VIDEOS

PREVIEW CLIP

CLIP NAME:   [ SAVE ]

CHICAGO, IL (60610) WEATHER - FORECASTS, RADAR MAPS, VIDEO AND NEWS

FIVE-DAY FORECAST (DETAILS)

| TOMORROW NOV 29 | FRIDAY NOV 30 | SATURDAY DEC 01 |
|---|---|---|
| FAIR | FAIR | FLURRIES |
| HI: 35° | HI: 35° | HI: 33° |
| LO: 23° | LO: 22° | LO: 21° |

DETAILED TEN-DAY FORECAST — 412

406 — 400

```
                    Nested Levels 0  1  2  3  4  5  6  7  8
        |--|--|--|--|--|--|--|--|

1     <div id="head">
 2     <div id="page" class="local">
 3        <div id="nav">
 4        <div id="content">
 5           <div id="subhead"/>
 6           <div id="area1" class= "region6">
 7              <h1>
 8              <p id="tf1" class="warn" style="display: none;"/>
 9              <div id="localNav" class="parent chrome1 single1">
10              <div id="current" class="parent chrome1 single1">
11              <div id="fiveDay" class="parent chrome1 single1">
12                 <div class="child cl first table">
13                    <table class="t1">
14                       <colgroup width="20%" span="5"/>
15                       <tbody>
16                          <tr class="rs2">
17                             <th colspan="3">
18                             <td colspan="2"/>
19                          </tr>
20                          <tr class="rs1">
21                          <tr class="rs1">
22                       </tbody>
23                    </table>
24                 </div>
25                 <a class="more"
26                 href="tenday.aspx?wealocations=wc:USIL0225">
27                 Detailed ten-day forecast</a>
28              </div>
29              <div id="map" class="parent promo chrome5 double2">
30              <div class="mapmore">
31              <script>
```

FIGURE 5

METHOD AND SYSTEM FOR PROVIDING PORTIONS OF INFORMATION CONTENT TO A CLIENT DEVICE

CROSS REFERENCE TO RELATED APPLICATION

The present patent application claims priority under 35 U.S.C. §119(e) to U.S. Provisional Patent Application Ser. No. 60/889,134, filed on Feb. 9, 2007, the entire contents of which are incorporated herein by reference as if fully set forth in this description.

FIELD OF INVENTION

The present application relates generally to the field of web browsing and network communications. More specifically, the application relates to a system and method for adapting and presenting information from web pages containing content designed for large screen computers to a handheld device, such as a cellular telephone or a personal digital assistance (PDA).

BACKGROUND

Today, many worldwide web pages (HTML documents) are available that offer a variety of textual and non-textual types of content. On a traditional desktop or laptop computer with a large screen running a standard web browser, these types of content are easily arranged and displayed for viewing. For example, web sites for searching realtor property listings often deliver a plurality of images for the viewer to quickly scan for a property of interest. When the user identifies a property of interest, the user can then read the details associated with the image of that specific property and select that image for further details about the property.

At the same time, the field of communications, and more specifically wireless telecommunications, is currently undergoing a radical expansion. This technological expansion allows an electronic device, such as mobile personal digital assistant (PDA), cellular phone, pager, and other electronic devices to connect to the same information sources, such as a web server or database, as one could with the PC and a PC-based browser. Several small device client browsers are available which deliver content from the web to the handheld devices.

However, these small devices typically lack the screen space or navigation capabilities to display web content intended for display on a desktop or laptop computer. Thus, there are a number of techniques client browsers utilize to assist the user in navigating the web pages on the small screens. For example, client browsers may alter the layout of web content, change the positioning of images, or simply not display some web content.

SUMMARY

Within embodiments described below, a method of providing information content for display is provided. The method includes receiving at a server from a mobile device a request for less than all content in a web page. The request will include an identification of the web page and information identifying a portion of the content in the web page. The method also includes retrieving a main document of the web page, identifying within the main document of the web page the portion of the content in the web page using the information provided in the request, and transforming the portion of content identified in the web page for viewing on the mobile device. The method further includes sending the transformed portion of content to the mobile device.

In another embodiment, a system is provided that includes a processor and memory including software applications executable by the processor. The processor receives from a mobile device requests for less than all content in a web page. The request will include an identification of the web page and information identifying a portion of the content in the web page. The software applications in the memory include a server browser for retrieving a main document of the web page from an information source, a clip identifier for identifying within the main document the portion of the content in the web page using the information provided in the request, and a content modification module for transforming the identified portion of the content in the web page for display on the mobile device. The system further includes an interface for sending the transformed information content to the mobile device.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

BRIEF DESCRIPTION OF FIGURES

FIG. 2 illustrates one example of a web page displayed on a desktop monitor, and displayed on a mobile handset.

FIG. 4 illustrates an example of a conceptual view of an electronic tool for selecting portions of a web page for viewing on a client device.

FIG. 5 includes example HTML code that comprises a portion of the web page shown in FIG. 4.

DETAILED DESCRIPTION

The present application provides a manner of personalizing information content for display on handheld or mobile devices. Typically, small devices lack screen space or navigation capabilities to display web content intended for display on a desktop or laptop computer. Thus, there are a number of techniques client browsers utilize to assist a user in navigating the web pages on the small screens. For example, client browsers may transform a web page by altering the layout of web content, changing the positioning of images, or simply not displaying some web content.

A user may view and explore a web page for a first time to view interesting and/or relevant material of the web page. For a first time visit, it may be important to give the user a global sense of the web page structure using web page transformation techniques such as a snapshot view, for example. Alternatively, a user may view and explore a web page on a reoccurring basis. In this instance, the user may want to quickly access content for which the user already has an approximation of where the content is located on the page (i.e., weather report, top story, blogroll). A user may develop repetitive usage patterns and strategies to access information or functionality that the user needs to quickly access. When a web page is visited on a reoccurring basis, much of the content on the page can become irrelevant to the user, such as navigation menus, archives, site maps, etc. On a desktop computer or standard web browser, non-core content can easily be ignored because mouse navigation is not linear, however, on a handset or mobile browser, repeatedly having to navigate beyond or around non-core content can be slow and deter a user from using the handset for web browsing. Additionally, downloading unneeded or unwanted parts of a web page can be costly to the user both monetarily (if the user has a metered data account) and considering a time aspect (downloading/parsing unneeded content).

The present application provides a manner for providing users with specific content from web pages that the users desire in a quick and accurate manner. A user may identify sections of a web page as "clips," and a user can then return directly to and download only the clip sections (e.g., and store the clip sections as personal bookmarks). The clips are live updates from a web site (not cached web page sections) that present the latest content from a web page.

Figure 1:
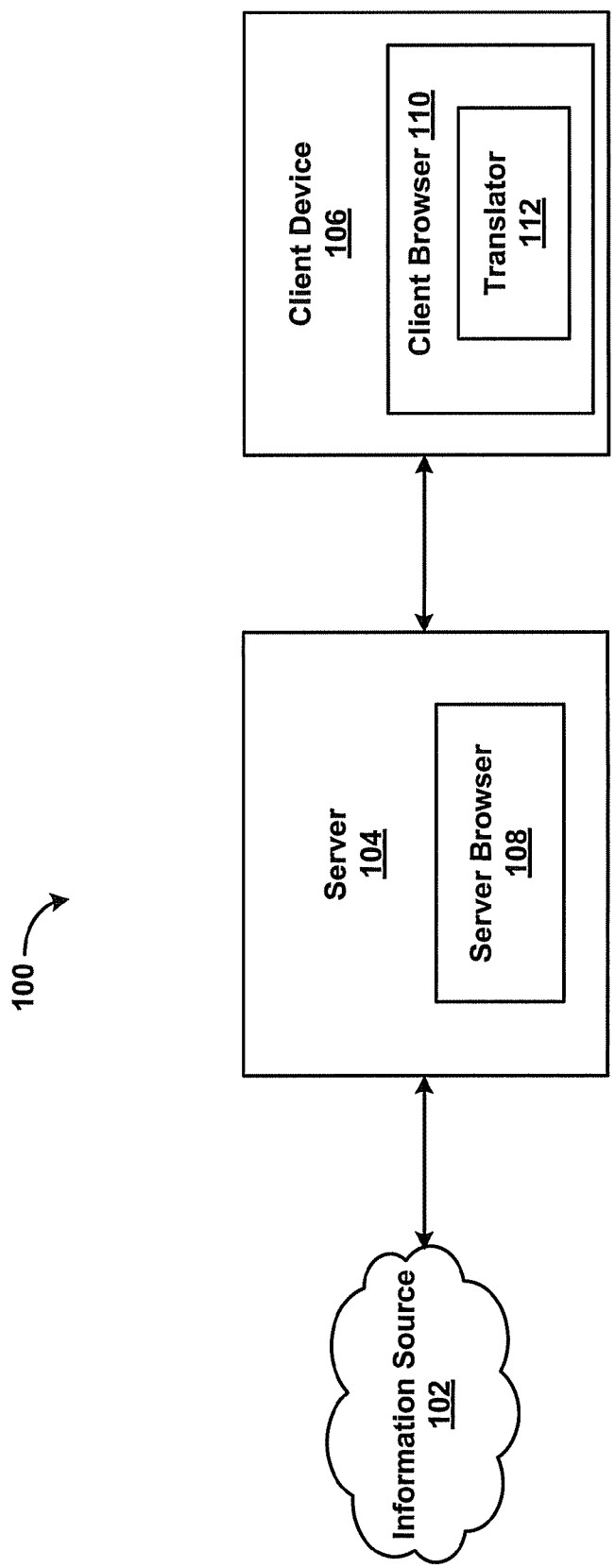
FIG. 1 is a diagram illustrating an example system for accessing, adapting, and presenting interactive animated information content to electronic devices.

Referring now to FIG. 1, a high-level diagram is shown illustrating an exemplary system 100 for accessing, adapting, and presenting information content to electronic devices. The system 100 includes an information source 102, a server 104 and a client device 106.

The information source 102 includes any type of device such as a web server, application server, database or other backend system, or any interface to an information provider. The information source 102 provides information content expressed in a markup language, such as those markup languages known in the art including Hypertext Markup Language (HTML), Extensible Markup Language (XML) with or without Extensible Style Sheets (XSL), VoiceXML, Extensible Hypertext Markup Language (XHTML), or Wireless Markup Language (WML). Furthermore, the information content can reference images, video, or audio information to be provided by the information source 102. The information content may be referenced via a main or parent HTML document, which includes references to subdocuments (e.g., files, images, etc.).

The information source 102 can be accessed through any type of network by the server 104 via a server browser 108. The server browser 108 may communicate with the client device 106 over any type of network through a client browser 110. The server browser 108 acts as a proxy between the client browser 110 and the information source 102 of web page content for viewing. The server browser 108 may operate as a client of the information source 102 to retrieve the information content. For example, using a known suite of communications protocols such as Transmission Control Protocol/Internet Protocol (TCP/IP), the server browser 108 can issue a Hypertext Transfer Protocol (HTTP) request to the information source 102. By utilizing HTTP requests, such as is known in the art, the server browser 108 can access information content, including applications, static and dynamic content at the information source 102. Dynamic content can include script codes such as JavaScript, developed by Netscape (www.netscape.com), and Jscript, developed by Microsoft (www.microsoft.com). Javascript is also a component of Dynamic HTML (DHTML), which is an alternative technology for delivering rich internet applications with interactive animated content. Dynamic content can also include various other interactive animated content types, for example, Adobe Flash, Microsoft Silverlight, Sun JavaFX, and W3C SVG.

The server browser 108 and the client browser 110 may reside on the same platform or may be separate from each other. For example, the server browser 108 might be hosted on a back-end server, and the client browser 110 might be hosted on a hand-held electronic device, as shown in FIG. 1. However, it should be understood that the server browser 108 and client browser 110 can be hosted on the same platform such as on an electronic device, if the platform or electronic device has appropriate hardware and network capabilities. Thus, within many embodiments herein, functionality may be described as being part of the client browser 110 or as being part of the server browser 108. It should be understood that the client device 106 and the server 104 may co-exist on the same device, and thus functionality of either can be substituted by each other. Thus, the client browser 110 may perform functions explained as being performed by the server browser 108, and the server browser 108 may perform functions explained as being performed by the client browser 110. By utilizing the server and client browser, smaller electronic devices with limited hardware capability can access feature rich information or data.

Generally, the server 104 and the client device 106 include a central processing unit, a memory (a primary and/or secondary memory unit), an input interface for receiving data, an input interface for receiving input signals from one or more input devices (for example, a keyboard, mouse, etc.), and an output interface for communications with an output device (for example, a monitor). In general, it should be understood that the server 104 and the client device 106 could include hardware objects developed using integrated circuit development technologies, or the combination of hardware and software objects that could be ordered, parameterized, and connected in a software environment to implement different functions described herein. Also, the hardware objects could communicate using electrical signals, with states of the signals representing different data. It should also be noted that the server 104 and the client device 106 generally execute application programs resident at the server 104 and the client device 106 under the control of an operating system. The application programs, such as the server browser 108 and the client browser 110, may be stored on memory within the server 104 and the client device 106 and may be provided using machine language instructions or software with object-oriented instructions, such as the Java programming language. However, other programming languages (such as the C++ programming language for instance) could be used as well.

As an example, the client browser 110 may reside on the client device 106, which may be an electronic device including any of a personal computer (PC), wireless telephone, personal digital assistant (PDA), hand-held computer, network appliance, and a wide variety of other types of electronic devices that might have navigational capability (e.g., keyboard, touch screen, mouse, etc.) and an optional display for viewing downloaded information content. Furthermore, the client device 106 can include any type of device that has the capability to utilize speech synthesis markups such as W3C (www.w3.org) Voice Extensible Markup Language (VoiceXML). One skilled in the art of computer systems will understand that the example embodiments are not limited to any particular class or model of computer employed for the client device 106 and will be able to select an appropriate system.

To provide an exemplary illustration, assume that a PDA hosts a client browser 110, a PC hosts the server browser 108, and the PDA and PC are both connected to an Ethernet network. Then, the client browser 110 and the server browser 108 could perform information transactions over the Ethernet network. Such transactions would utilize Ethernet or similarly IEEE 802.3 protocols. Nevertheless, in this example, the client and server browsers communicate over a wired network. The communications might also include a wireless network such as a local area wireless network (LAWN) or wireless local area network (WLAN). Moreover, the communications might include wireless networks that utilize other known protocols and technologies such as Bluetooth, wireless application protocol (WAP), time division multiple access (TDMA), or code division multiple access (CDMA).

Referring again to FIG. 1, the client browser 110 can send a request for information to the server browser 108. The client browser 110 may include an event translator 112 to convert a request/response protocol, such as an HTTP request, from the client browser 110 (e.g., WML, XHTML, cHTML, etc.) to an event that the server browser 108 recognizes. The translation process could include event information, content information, and the context of the event such that transactions between the client browser 110 and the information source 102 (e.g. HTML form submission) are preserved.

Information content from the information source 102 is retrieved and can be tailored for use on the client browser 110 by the server browser 108. Alternatively, the server browser 108 may retrieve the information and send the information to the client browser 110, which itself tailors the information appropriately for viewing. Content transformations may be necessary since the requested content (e.g., a web page) could have been initially designed for viewing on a large screen of a PC, rather than on a limited screen size of a handheld device. As a result, either the server browser 108 or the client browser 110 can perform information content transformations or apply device specific style sheets to aid in presentation (e.g., display or voice) and navigation (e.g., keyboard, touch screen, or scrolling), and perform content grouping for electronic devices that accepts data in limited quantities.

The terms "transform" and "transformation", in the context of this application, are used to describe a process, which may be implemented using computer software or hardware, to transcode, modify, adapt, alter, convert, re-form, rearrange, reshape, and/or otherwise change information content. As such, information content may be "transformed" into "transformed information content" by use of computer hardware or software.

To deliver these capabilities, the server browser 108 or client browser 110 may include modules (not shown) including a user agent, cookie handler, QDOM, script executor, normalizer, and serializer, for example. Additional information pertaining to information content transformation or customization is included in U.S. Pat. No. 7,072,984, entitled "System and method for accessing customized information over the internet using a browser for a plurality of electronic devices," U.S. patent application Ser. No. 10/280,263, entitled "System and Method for Displaying Information Content with Selective Horizontal Scrolling," and U.S. patent application Ser. No. 09/843,036, entitled "System and Method for Adapting Information Content for an Electronic Device," the contents of each of which are incorporated herein by reference as if fully set forth in this description.

Many different content transformations can occur based on the information present within a requested web page, for example, and based on the web page that is requested. In exemplary embodiments, a user may identify sections of a web page as "clips," and can then return to a web page and receive only the identified sections of the web page in a transformed format.

FIG. 2 illustrates one example of a web page 200 displayed on a desktop monitor 202, and displayed on a mobile handset 204. As shown, the web page 200 may include many different rows, columns or sections, which include a logical organization of a web page into sub-groups, and where section boundaries are dictated by HTML block elements, headers and other grouping structures. The web page may be transformed and broken down into many segments, which are separate sections that can be delivered to a mobile handset. One of the sections, section 206, can be selected and identified as a clip. Using methods described herein, the next time a user loads the web page 200 on the mobile handset 204, only identified clip sections, such as the clip section 206 indicated in FIG. 2 using dotted lines, may be retrieved and sent to the mobile handset 204 for display. In the example shown in FIG. 2, a user could identify and retrieve only the latest stock market chart, corresponding to section 206 from the web page 200, which includes many other areas of information. Using a clip viewing method, like in this example, enables web page content to be personalized for each user, so that only information that a user desires to view is displayed. Consequently, the entire web page does not have to be retrieved, transformed and sent to the mobile handset 204, and thus, the desired information can be loaded more quickly.

Using the methods of the present application, a user can personalize or prioritize which information is loaded from selected web pages. A user will first identify information from selected web pages, and once the selected web page is loaded, only the identified information will be displayed on the mobile handset.

Figure 3:
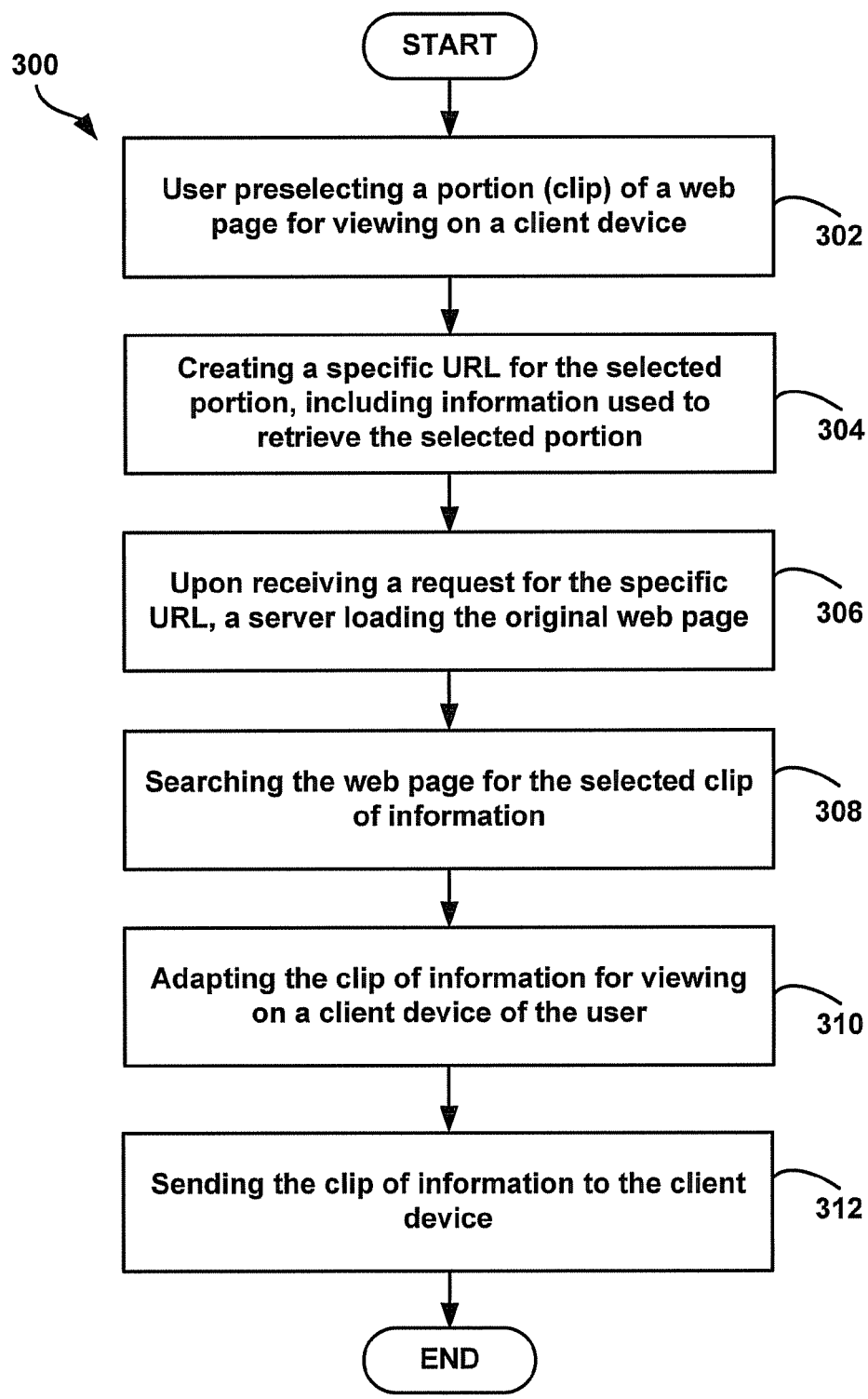
FIG. 3 is a flowchart depicting example functional steps for a method of processing information content for display on a client device.

FIG. 3 is a flowchart depicting functional steps for a method 300 of processing information content for display on a client device. It should be understood that each block in this flowchart (and within other flow diagrams presented herein) may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Initially, as shown at block 302, a user preselects a portion (e.g., referred to as a "clip") of a web page for viewing on a client device. The user may select from a limited number of clips identified within the web page. Next, a server creates a specific URL for the selected portion of the web page, including information that can be used to retrieve the selected portion, as shown 304. For example, a new uniform resource locator (URL) is created and includes the selected portion of the web page and is sent to the client device.

Subsequently, upon receiving a request for the specific URL from a client device of the user, the server will load the original web page, as shown at block 306. The server then searches the web page for the selected clip of information, as shown at block 308. The server can iterate throughout the main document (e.g., HTML code) of the web page to identify the selected portion. The server then adapts the identified clip of information for viewing on the user's client device, as shown at block 310. As mentioned above, many different techniques may be used to adapt or transform the web page content for viewing on a client device. In addition, additional information may be inserted into the content, such as logos, a link to the original full web page, an advertisement, navigational bars, etc. Once transformed, the server then sends the clip of information to the client device, as shown at block 312.

Using the method shown in FIG. 3, a user may receive information from a web page on a client device faster than a typical process since only a portion of the web page is retrieved and adapted for viewing on the client device, and thus, less information is processed and less information is delivered to the client device. As a result, the information will be processed more quickly and delivered to the client device more quickly. Furthermore, once received, the user can view desired information that the user preselected for viewing, and will not be required to scroll through an entire web page to view desired information. Thus, navigation time on the client device is also lessoned.

Selecting and Identifying Information from Web Pares

Using methods of the present application, initially, a user selects information from a limited number of pre-identified content clips contained within a web page for viewing. Clips of content may be identified using a browser on a client device (e.g., a mobile handset) or a browser on a desktop computer. A browser can be opened in a clip selection mode, and the user may then identify a section that the user wants to save as a clip. When the clip selection mode page is executed, the user will be presented with a special version of a normalized web page in which all navigable items (anchors, image maps, input fields) are disabled (but visible) and instead a colored or dashed box may be displayed that surrounds areas identified as candidate clips. Clip candidates can be determined by a server (e.g., server 104 shown in FIG. 1), and users may not be able to arbitrarily select any parts of a page as clips, but rather can navigate from one clip candidate to another using navigation keys. Using this manner, web clipping is more deterministic. Not all parts of a web page will necessarily be available in a clip. Clips can also be nested. For example, as a user navigates down from an outer clip, inner clips will be successively navigable.

Alternatively, a user may point a mouse pointer to an area of the web page to draw a box around a portion of information to clip out. The user can then request that the selected information be saved as a clip, and if possible, the server 104 can do so.

FIG. 4 illustrates an example of a conceptual view of an electronic tool for selecting portions of a web page for viewing on a client device. The electronic tool 400 includes a main viewing area 402, in which a user views an original web page 404, and a preview viewing area 406, in which a user views a preview of a selected portion.

Within the web page 404, a limited number of pre-identified content 408 and 410 are presented to the user for selection. The content in this example includes a five-day weather forecast 408 and local news 410. The electronic tool 400 will load the original web page 404 and present to the user areas that may be selected as clips, which are small portions of the web page. Only certain areas of the web page 404 may be selected by a user for clip viewing. Once a user selects a clip, such as clip 408, a user is presented with a preview of how the selected information will be displayed on the user's client device within the preview viewing area 406. As shown in FIG. 4, the user has selected clip 408, and after the transforming process, the clip 408 will be displayed to the user as clip 412. The preview viewing area 406 displays information content as will be seen on the user's client device. Thus, the electronic tool 400 can tale into account specific characteristics of the user's client device to illustrate to the user how the information will look when viewed using the client device.

The electronic tool 400 may be proprietary software run on a desktop computer or on the user's client device. A user can log into a user profile to load the electronic tool 400, which will identify areas that can be clipped within web pages. A user can manage clips, delete clips, and create new clips as desired using the electronic tool 400.

To identify candidate clips (or pre-identify portions of the web page as possible clips), the server (such as server 104 in FIG. 1) divides the web page into sections using HTML block elements as dividers. The server may also use any number of sign-posts within the HTML code to delineate sections for clipping, such as, HTML ID tags, name tags, titles of sections, or other markup in the HTML code. Alternatively, clips may be manually selected and then presented to a user by the server for selection.

As an example, consider the web page 404 and the clip 408 in FIG. 4. FIG. 5 includes HTML code that comprises a portion of the web page 404. In particular, the HTML code within the box in FIG. 5 (e.g., from lines 11-27) comprises the clip 408.

Any number of clips may be identified as candidate clips on a web page based on an element with a beginning and an ending HTML tag (e.g., in the form < . . . >, </ . . . >). As discussed, a web page comprises one or more browser commands written in a markup language, such as HTML. Specifically, HTML browser commands comprise one or more HTML elements. An HTML element includes at least one tag, and may include a start tag, content, and an end tag. A start tag is of the form <tag[attrib1="value", [attrib2="value2" . . . ]>, where tag is the HTML command to be executed, and attrib1 and attrib2 are optional attributes that modify and/or provide information about the HTML command. The content begins after the start tag. End tags delimit the end of the content and are typically denoted as </tag>.

HTML code can be divided based on the elements contained therein. For example, the portion included in FIG. 5 can be divided based on the division ("<div>") elements, which are used in HTML to divide a document into artificial sections such as chapters, sections, appendix and so on. The <div> element can be referenced by the <div> tag's name, which is specified by an "id". For example, the clip 408 can be referenced by the <div> element id "fiveDay", as shown at line 11 of the HTML code in FIG. 5. Additional attributes can also be used to reference areas of a web page, such as a class of a <div> element, a table ("<table>") element, or any other element. Thus, by referencing a <div> element that has the id "fiveDay", the clip 408 can be identified.

Additionally, nested information may be included within the clip, such as a nested table of information like that included in the HTML code of the clip 408. In the example of FIG. 5, the clip "fiveDay" may be identified first by identifying a beginning <div> tag at line 11, and following through the code to identify a corresponding ending </div> tag at line 28. The HTML code from lines 11-27, when executed by a browser, will render the clip 412 displayed in FIG. 4.

As mentioned, clip candidates can be predetermined by a server or a user may point a mouse pointer to an area of the web page to draw a box around a portion of information to clip out. In the event that the clips are predetermined, the server can search for beginning <div> and ending </div> tags within the HTML code at a certain nested level. FIG. 5 illustrates eight nested levels for the HTML code, where each level includes additional information. The server may search for beginning and ending <div> tags within the HTML code that have a nested level of three or less, for example. It has been found that using such a technique renders clips in an acceptable manner. Defining a clip using <div> tags delineations of higher nested levels, such as five or six, may result in a loss of too much information. In addition, defining a clip using <div> tags delineations of lower nested levels, such as two or one, may include unnecessary information. However, clips may be defined using HTML tag delineations of any nested level.

After predetermining all candidate clips, the server will be able to present the candidate clips to the user via the electronic tool 400 of FIG. 4 as portions of the web page with a box drawn around the candidate clips, for example.

In the event that a user may point a mouse pointer to an area of a web page to draw a box around a portion of information to clip out, a server can accept or deny the requested clip. The server may recognize a selected portion of the web page, and again identify a suitable beginning and ending HTML tag set corresponding to the user-selected area of the web page. To recognize the selection portion, in one example, the server may identify selected content within the HTML code and create a clip based on the HTML tag set that encompasses the selected content.

Storing Selected Clips of Information

Once a user has identified or selected a clip (or more than one clip) from a web page, the server can store information that can be used to retrieve the identified clip at a later time when requested to do so by the user. The clip is simply a portion of the original full web page, and thus the server stores information that allows the server to identify the specific portion of the web page defined as the clip.

The server will create a unique uniform resource locator (URL) to identify the clip. The server will create and store a unique URL for each clip that a user selects. Alternatively, the server will create and store a unique URL that identifies multiple clips. For example, a new web page including only the small portion of the original web page is created and given a new URL. Still alternatively, the server will create a unique URL that identifies the clip and send the URL to client device for storage.

The URL will contain the original web site URL, any unique query strings entered by the user on the web page (e.g., address, zip code) and information required to retrieve and process the clip. Additional information may include a <div> tag name, ID, other HTML attributes, a type of clip (e.g., class, name, ID, etc.) as well as any other information that has been collected. For instance, a size of the clip can be measured when the user selects the clip, which can be used to identify the clip within the original full web page as well.

Referring again to the example shown in FIGS. 4 and 5, the server may create the following URL for the clip 412: www.weather.com/div-tag-id="fiveDay", or in a format such as http://www.[website name].com?Clip=[clipName]. The unique URL is then sent to the client device. Of course, formats other than a URL may be used as well. For example, the server may simply store information in a database, which would include the original web page and the information used to retrieve the identified clip. The information may be given a unique identifier, which is also sent to the client device. The client device may use the unique ID to request the clip, and when the unique ID is received at the server, the server can reference the database to identify information to use to retrieve the clip for the client device.

Requesting and Receiving Clips of Information

When a user of a client device desires to view a clip, the user will load a browser on the client device and load the unique URL pertaining to the desired clip. The client device will then communicate in a typical fashion with the server, as discussed above with regard to FIG. 1, using typical HTTP GET messages to request and retrieve the clip, for example.

When the server receives the request, the server will receive the unique URL and request the original web page identified in the URL from an information source. The server may first request a main or parent document of the web page that includes the HTML framework for the webpage. Once the server receives and loads the main document, the server typically would begin to normalize and transform the web page for viewing on the client device. However, prior to transforming any information content of the web page, the server will search within the main document for an element that matches the information provided within the unique URL. For example, referring back to the example in FIG. 5, the server will search for a beginning <div> tag that has an id="fiveDay". The server will then set a "clip start" to the node of the found element, and insert a node after the found block (e.g., at an ending </div> tag that corresponds to the found beginning <div> tag) and set a "clip end" to this node.

In this manner, the server has segmented the original web page along the clip start and clip end boundaries. The server can then insert any special content to the clip, such as a URL referring to the original web page or an advertisement. The server will then only transform the identified clip content, and deliver only the transformed clip segment with no segment navigation bars to the client device for viewing.

Using this method, the clips will include live or up to date information because the server retrieves, in real-time, the original web page from which the clips of information are retrieved. The clips are not retrieved from storage and then sent to a client device, but rather, each time the client device requests a clip, the server will load the original web page to retrieve the current information and then identify the clip of information to be sent to the client device. Thus, the server recreates the clip each time the clip is requested.

As mentioned, the server will receive the unique URL and request the original web page from the information source. The server may first only request the main document of the web page that includes the HTML framework for the webpage. The server can then identify the requested portion within the main document, transform the identified information, and send the transformed information to the client device. At this stage, the transformed portion may only include textual content, and/or a framework of the web page. Subsequently, the server can then identify any subdocuments that are present within or referenced to within the identified portion of the main document. Subdocuments may include any files referenced within the main document, such as image files. Using this sequence of steps, after the server sends the transformed portion of the main document to the client device, the server may identify and retrieve any subdocuments within the portion of the main document, transform the subdocuments, and then send the transformed subdocuments to the client device.

In another alternative sequence, the server may receive the unique URL from the client device and request the original web page from the information source. The server can receive the main document of the web page that includes the HTML framework for the webpage, and then identify the requested portion within the main document. At this point, the server can then identify any subdocuments within the identified portion of the main document, and request and receive the subdocuments from the information source. Finally, the server can transform the requested portion of the main document including any subdocuments present within the portion, and send all transformed content to the client device.

In yet another alternative sequence, the server may receive the unique URL from the client device and request the original full web page from the information source including both the main document and any subdocuments referenced therein. The server may then identify the requested portion of the web page, transform the requested portion, and send the transformed portion to the client device.

In still another alternative sequence, the server may only send the transformed portion of the main document to the client device. The client will receive the portion of the main document, and determine that the portion includes references to subdocuments. The client may then send a second request to the server requesting the subdocuments. At this time, the server may request and receive the subdocuments from the information source, transform the subdocuments for viewing on the client device, and send the transformed subdocuments to the client device.

The server will perform the transformation of content in the manner described above, and within related applications referred to herein. In addition, the server may process cascading style sheets (CSS) and JavaScript associated in identified content prior to or in connection with the transformation of the content.

Upon receiving transformed information, the client device will display the information in a typical manner using a client browser. Alternatively, the client device may include a clip viewer, which may enable viewing of multiple clips such as similar to a slide show viewer. When a user loads a clip viewer, the first clip could be immediately loaded. At the top of the screen there could be controls for going forward and backward though the user's clip list as well as navigating directly to a clip.

In addition, since clips are typically small sections of targeted information, a user might want to be able to view multiple clips on a single page (weather, stock indices, etc). Clips are accessed via a unique URL, so they can be independently loaded as subsections of a document. A user can choose an order in which clips are presented. To request multiple clips on a single page, the request sent by the client device will include the unique URL, which will include the URL to the web page from which the clips are found and information pertaining to each portion of the web page that is requested. For example, the unique URL may include the URL to the web page and a chain of a list of ID attributes appended to the end of the URL, where each attribute identifies a section of the web page. The server will then retrieve all sections of the web page, form the retrieved sections into one web page, transform the web page, and send the transformed web page to the client device.

Exemplary Server

Figure 6:
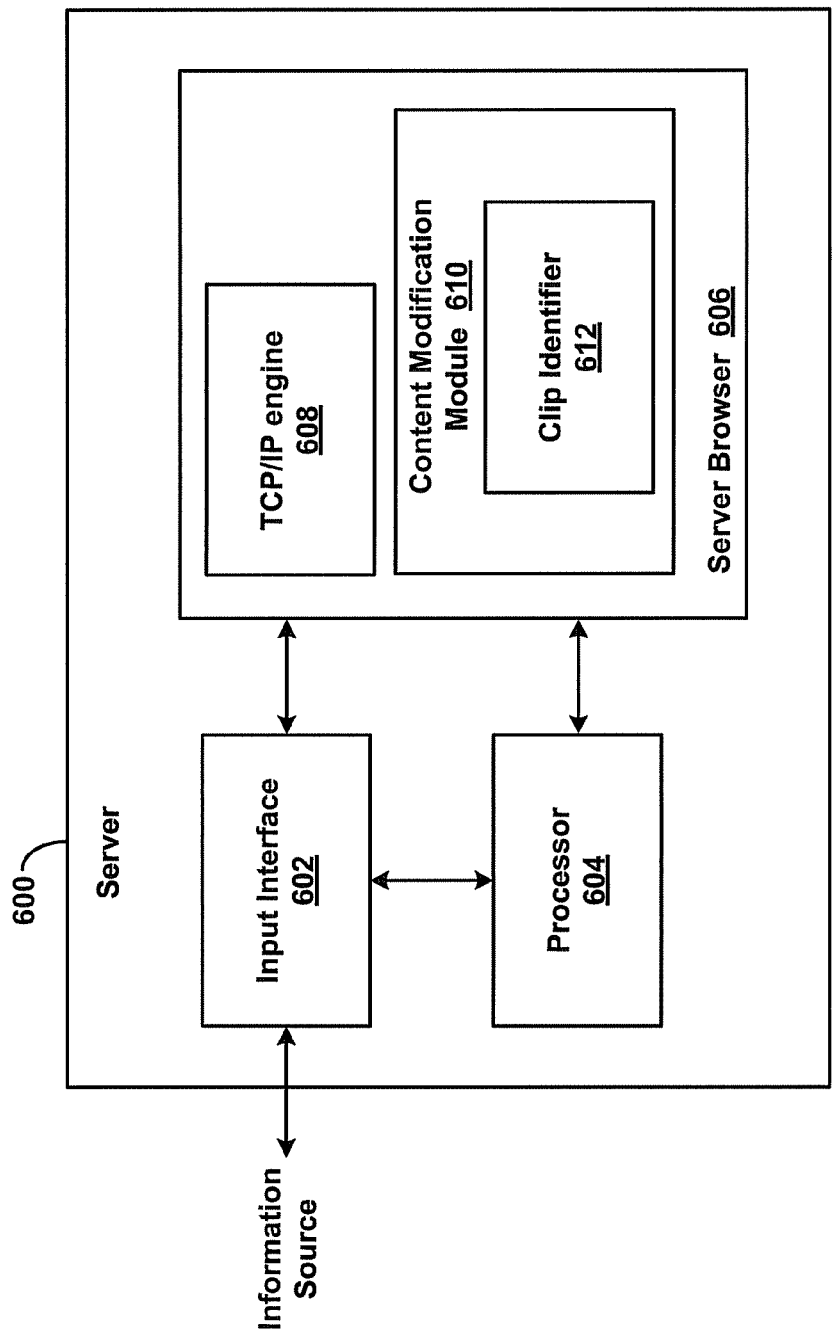
FIG. 6 is a block diagram illustrating one example of a server for performing a portion of the method depicted in the flowchart of FIG. 3, for example, and for performing other methods discussed herein.

FIG. 6 is a block diagram illustrating one example of a server 600 for performing a portion of the method depicted in the flowchart of FIG. 3, for example, and for performing other methods discussed herein. The server 600 includes an input interface 602 coupled to a processor 604 and a server browser 606. The server browser 606 may be stored in memory (not shown) so that the processor 604 accesses the memory to execute software or program instructions that enable operation of the server browser 606. The server browser 606 includes components such as a TCP/IP engine 608 and a content modification module 610. The content modification module 610 may include a clip identifier 612 that may be executed through additional software or program instructions as plugins to the browser, for example.

The server browser 606 is a software application that is executable by the processor 604 to read an electronic document or electronic data, and render the data into a visual display of text and/or graphics for display. The server browser 606 may include such operating functional components as windows, pull-down menus, buttons, and scroll bars, and thus may be a typical web browser.

The server 600 will receive requests for information from client devices, and will responsively access an information source to retrieve the information. The server 600 will then be operated by the processor 604 to convert the information into a form accessible by the requesting client device. For example, a client device may request a typical web page, and thus the server 600 will access the Internet and retrieve the requested web page and then the server browser 606 can convert the web page into a form accessible by the client device.

In exemplary embodiments, the server 600 will receive a request for a web clipping in the form of a specific URL, which contains both a URL for a web page and information identifying a portion of the web page. The server 600 will then request and receive the full web page from an information source and load the full web page using the server browser 606. The clip identifier 612 will use the information provided by the client device to identify the clip of information desired by the client device, and then the content modification module 610 will only transform the identified clip of information, as described above. The server 600 will then send the transformed clip of information to the client device.

In addition, the request sent by the client device may include information that identifies characteristics of the client device, such as within an HTTP header message for example. The server 600 may further include or otherwise have access to a database that includes information pertaining to client devices. In this manner, the server 600 may then use the information provided by the client device to access the database and look up specific characteristics about the client device. For example, the server 600 may access the database to determine a screen size, processor capability, and/or network or transmission capability of the client device, and then tailor the transformed clip of information specifically for that client device. If a device has a larger screen, images may be sized appropriately, for example. If the client device is using an Enhanced Data rates for GSM Evolution (EDGE) or Enhanced General Packet Radio Service (EGPRS) network, or other networks that allow increased data transmission rates and improved data transmission reliability, more data may be sent to the client device, for example.

Using the methods described herein, data delivery is accelerated by only transforming a portion, or less than all content provided by a web page for viewing on a client device. Less data is transformed, and thus, the transforming process is completed more quickly. In addition, less transformed data is sent to the client device, and thus, the data transmission time is lowered.

In an alternate embodiment, it may be the case that a user would like to view an original format of a clip, or that a clip may require less screen space in an original format rather than after a transformation. A user may be able to inform the server that no transforming is desired such that a web clip would be provided without any or a full transformation to the client device. However, because less content would be sent, the web clipping methods enable content acceleration.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

In view of the wide variety of embodiments to which the principles of the present application can be applied, it should be understood that the illustrated embodiments are exemplary only, and should not be taken as limiting the scope of the present application. For example, the steps of the flow diagrams may be taken in sequences other than those described, and more or fewer elements may be used in the block diagrams. While various elements of embodiments have been described as being implemented in software, in other embodiments hardware or firmware implementations may alternatively be used, and vice-versa.

Note that while the present application has been described in the context of a fully functional server and client device system and method, those skilled in the art will appreciate that mechanisms of the present application are capable of being distributed in the form of a computer-readable medium of instructions in a variety of forms, and that the present application applies equally regardless of the particular type of signal bearing media used to actually carry out the distribution. For example, a computer usable medium can include a readable memory device, such as a hard drive device, CD-ROM, a DVD-ROM, or a computer diskefte, having computer readable program code segments stored thereon. The computer readable medium can also include a communications or transmission medium, such as, a bus or a communication link, either optical, wired or wireless having program code segments carried thereon as digital or analog data signals. As such, the methods described herein may be embodied in a computer program product that includes one or more computer readable media, as described as being present within the server 104 or the client device 106.

The claims should not be read as limited to the described order or elements unless stated to that effect. Therefore, all embodiments that come within the scope and spirit of the following claims and equivalents thereto are claimed as the invention.

What is claimed is:

1. A method comprising:
   receiving an indication of a user input relative to a web page, wherein the user input is performed on a client device and identifies a clip of the web page that is less than all content in the web page;
   receiving at a processor from the client device a request for the clip of the web page, wherein the request includes an identification of the clip of the web page based on the user input relative to the web page and a Uniform Resource Locator (URL) of the web page;
   causing storage of information on a server describing the clip of the web page in association with the URL, wherein the information describing the clip of the web page comprises a hyper text markup language tag identifier;
   retrieving a main document of the web page;
   identifying within the main document of the web page the clip of the web page using the information describing the clip of the web page by searching for the hyper text markup language tag identifier and an ending hyper text markup language tag that corresponds to the hyper text markup language tag identifier;
   transforming the clip identified in the web page for viewing on the client device;
   determining to send the transformed clip to the client device; and
   causing storage of additional information on the client device to enable subsequent retrieval of the clip of the web page from the server based on the stored additional information on the server.

2. The method of claim 1, further comprising:
   determining to retrieve subdocuments included within the clip of the main document;
   determining to transform the subdocuments for viewing on the client device; and
   sending the transformed subdocuments to the client device.

3. The method of claim 2, wherein the transformed clip and the transformed subdocuments are sent to the client device together.

4. The method of claim 2, wherein the subdocuments include images.

5. The method of claim 1, wherein the main document includes hyper text markup language of the web page.

6. The method of claim 1, further comprising:
   receiving at the processor a sub-request for subdocuments identified within the transformed clip;
   determining to retrieve the subdocuments included within the clip of the main document;
   determining to transform the subdocuments for viewing on the client device; and
   determining to send the transformed subdocuments to the client device.

7. The method of claim 1, further comprising:
   determining to retrieve all content in the web page; and
   determining to identify the clip in the web page using the information provided in the request.

8. The method of claim 1, wherein identifying within the main document of the web page the clip in the web page u comprises identifying textual content within the main document of the web page.

9. The method of claim 1, further comprising:
   determining characteristics of the client device, and
   wherein transforming the clip identified in the web page for viewing on the client device comprises
      adapting the clip for display on the client device based on the characteristics of the device.

10. The method of claim 9, wherein determining characteristics of the client device comprises:
    receiving information identifying the client device within the request; and
    determining to access a database including characteristics of devices to identify the characteristics of the client device.

11. The method of claim 1, wherein the information describing the clip of the web page further includes any of the following: hyper text markup language tag attributes, a storage size of a section, or a viewing size of the section.

12. The method of claim 1, further comprising identifying a segment of the web page including information between the hyper text markup language tag identifier and the ending hyper text markup language tag as the clip.

13. The method of claim 1, wherein identifying within the main document of the web page the clip comprises searching for the information within nested levels of the main document of less than four.

14. The method of claim 1, wherein the URL comprises the information describing the clip of the web page.

15. The method of claim 14, wherein the information describing the clip is appended to the URL.

16. The method of claim 1, wherein the transformed clip that is sent to the device includes live updates from the web page.

17. The method of claim 1, wherein the web page includes multiple sections of information content where section boundaries are indicated by hyper text markup language elements, and wherein the clip corresponds to one of the sections of information.

18. The method of claim 1, wherein sending the transformed clip to the client device comprises accelerating data delivery to the client device.

19. An apparatus comprising:
at least one processor; and
at least one memory including computer program code for one or more programs,
the at least one memory and the computer program code configured to, with the at least one
processor, cause the apparatus to perform at least the following,
receive an indication of a user input relative to a web page, wherein the user input is performed on a client device and identifies a clip of the web page that is less than all content in the web page;
receive from the client device a request for the clip of the web page, wherein the request includes an identification of the clip of the web page based on the user input relative to the web page and a Uniform Resource Locator (URL) of the web page;
cause storage of information on a server describing the clip of the web page in association with the URL, wherein the information describing the clip of the web page comprises a hyper text markup language tag identifier;
retrieve a main document of the web page;
identify within the main document of the web page the clip of the web page using the information describing the clip of the web page by searching for the hyper text markup language tag identifier and an ending hyper text markup language tag that corresponds to the hyper text markup language tag identifier;
transform the clip identified in the web page for viewing on the client device;
determine to send the transformed clip to the client device; and
cause storage of additional information on the client device to enable subsequent retrieval of the clip of the web page from the server based on the stored additional information on the server.

20. A computer-readable non-transitory storage medium carrying one or more sequences of one or more instructions which, when executed by one or more processors, cause an apparatus to at least perform the following:
receive an indication of a user input relative to a web page, wherein the user input is performed on a client device and identifies a clip of the web page that is less than all content in the web page;
receive from the client device a request for the clip of the web page, wherein the request includes an identification of the clip of the web page based on the user input relative to the web page and a Uniform Resource Locator (URL) of the web page;
causing storage of information on a server describing the clip of the web page in association with the URL, wherein the information describing the clip of the web page comprises a hyper text markup language tag identifier;
retrieve a main document of the web page;
identify within the main document of the web page the clip of the web page using the information describing the clip of the web page by searching for the hyper text markup language tag identifier and an ending hyper text markup language tag that corresponds to the hyper text markup language tag identifier;
transform the clip identified in the web page for viewing on the client device;
determine to send the transformed clip to the client device; and
cause storage of additional information on the client device to enable subsequent retrieval of the clip of the web page from the server based on the stored additional information on the server.

* * * * *